United States Patent [19]

Hope et al.

[11] Patent Number: 5,066,554
[45] Date of Patent: Nov. 19, 1991

[54] FIRE AND MOISTURE PROOF ANODE CONSTRUCTION FOR ALKALINE METAL OR ALKALINE EARTH METAL BATTERIES

[76] Inventors: Henry F. Hope; Stephen F. Hope, both of Hope Insturies, Inc., Willow Grove, Pa. 19090

[21] Appl. No.: 498,696

[22] Filed: Mar. 26, 1990

[51] Int. Cl.⁵ .............................................. H01M 6/14
[52] U.S. Cl. ...................................... 429/48; 429/101
[58] Field of Search ................ 429/162, 101, 48, 212, 429/137, 246, 209

[56] References Cited

U.S. PATENT DOCUMENTS

| 2,666,802 | 1/1954 | Woodring et al. | 429/162 |
| 3,634,142 | 1/1972 | Eaton | 429/162 X |
| 3,723,183 | 3/1973 | Greatbatch | 429/199 X |
| 4,410,608 | 10/1983 | Goebel et al. | 429/101 |
| 4,808,496 | 2/1989 | Hope et al. | 429/192 |
| 4,812,376 | 3/1989 | Rudolph | 429/101 |
| 4,816,357 | 3/1989 | Hope et al. | 429/192 |

*Primary Examiner*—Anthony Skapars
*Attorney, Agent, or Firm*—Z. T. Wobensmith, III.

[57] ABSTRACT

Protection of anodes in alkaline metal or alkaline earth metal batteries is provided by covering the exposed side of the anode with a plastic film or metal foil that is coated with an adhesive composition, which plastic film and adhesive may be anhydrous.

14 Claims, 1 Drawing Sheet

10

25

FIRE AND MOISTURE PROOF ANODE CONSTRUCTION FOR ALKALINE METAL OR ALKALINE EARTH METAL BATTERIES

BACKGROUND OF THE INVENTION

1. Field of the Invention

This invention relates to fire and moisture proofing of anodes in alkaline metal or alkaline earth metal batteries by covering the anode with an adhesive coated plastic film or metal foil.

2. Description of the Prior Art

It is well recognized that alkaline metals such as lithium are difficult materials to work with, not only because of flammability, but because it sticks to itself and other material, and reacts with moisture. Lithium is however the material of choice for use in the anode of alkaline metal or alkaline earth metal batteries. Lithium is often used in the anode in plain foil form or as a coating on carbon, graphite or metal substrates. Whatever the material that lithium is used with it must be protected from moisture. In fabrication of alkaline metal or alkaline earth metal batteries construction takes place in a dry inert gas atmosphere. Protection of the exposed surface of the lithium anode after fabrication is required. Various methods have been proposed to protect the exposed lithium from moisture such as heat sealing around the edges of a plastic coated aluminum foil pouch or metal envelope. The anode is not protected from accidental damage such as hole punching because the pouch or envelope does not adhere to the anode.

The adhesive coated tape of the invention provides the required degree of protection and also acts to insulate the anode from electroconduction on the covered side.

SUMMARY OF THE INVENTION

It has now been found that lithium anodes can be protected by applying a plastic film and or metal foil to the exposed surface, which has an adhesive coating thereon, which adheres to the anode, resulting in fireproofing, insulating, and moisture proofing the anode.

The principal object of the invention is to provide anodes for alkaline metal or alkaline earth metal batteries, which are protected from gases, moisture, fire hazards and are electrically insulated.

A further object of the invention is to provide protection of the character aforesaid which is simple and results in easy handling of the anode and is easy to apply.

A further object of the invention is to provide protection of the character aforesaid which is simple and inexpensive to make but positive and long lasting in use.

A further object of the invention is to provide protection of the character aforesaid which can be applied to either pure alkaline metal or alkaline earth metal, or coated anodes.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof in which.

It should, of course, be understood that the description and drawings herein are illustrative merely and that various modifications and changes can be made in the structure disclosed without departing from the spirit of the invention.

DESCRIPTION OF THE PREFERRED EMBODIMENTS

Figure 1:
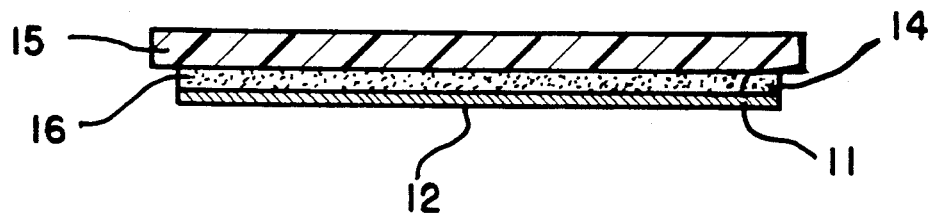
FIG. 1 is a side elevational view, partially broken away of a lithium foil anode incorporating the invention.

Referring now more particularly to the drawings and FIG. 1 thereof a typical lithium anode 10 as used in alkaline or alkaline earth metal batteries is therein illustrated. The anode 10 includes a layer 11 of lithium metal in pure form which is of foil configuration. The layer 10 on its side 12 is normally in contact with battery material (not shown) such as is disclosed in our prior U.S. Pat. Nos. 4,794,059, 4,808,496, and 4,816,357.

The anode 11 on the side 14 opposite to side 12 has a layer 15 of plastic film adjacent thereto, which has a coating 16 of adhesive thereon, adhering the layer 15 to the anode side 14. The film layer 15 can be of any suitable plastic material compatible with the other battery materials, such as polypropylene and polyester plastic. Kapton ® is a particularly suitable material and available from E.I. DuPont DeNemours, Wilmington, Del.

The coating 16 can be of any suitable type compatible with the lithium anode 10 and the other battery materials. Various well known, epoxide based, acrylic based, or rubber based adhesives are suitable. Such adhesive can also be anhydrous if desired. The layer 15 which surrounds the exposed lithium surface protects it from physical damage and with the adhesive coating 16 protects the lithium layer 11 from moisture, and sudden decomposition and fire due to exposure to moisture.

Figure 2:
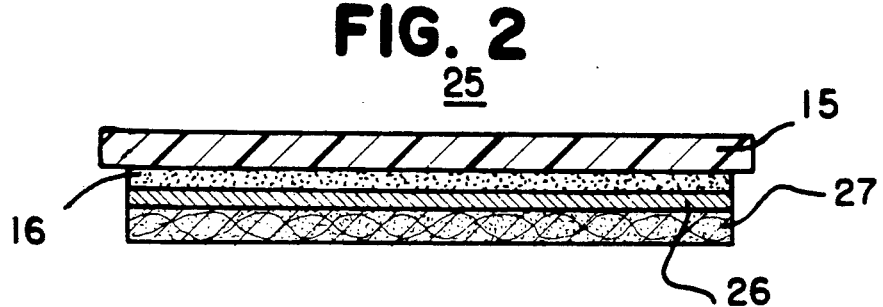
FIG. 2 is a view similar to FIG. 1, illustrating a lithium coated anode which incorporates the invention.
Figure 3:
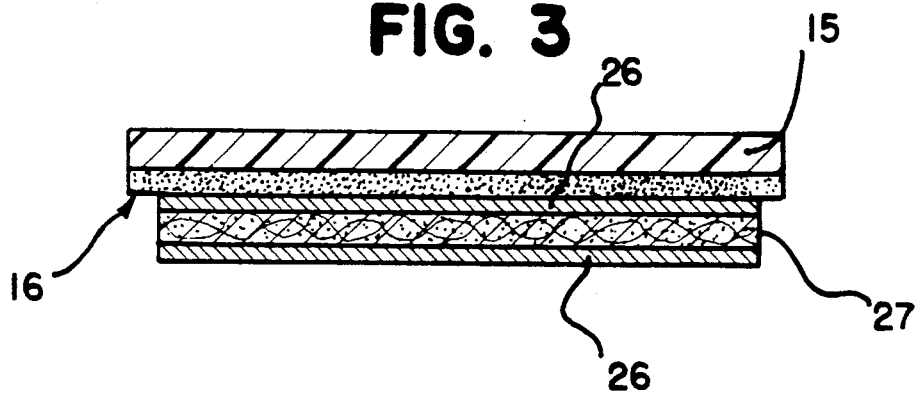
FIG. 3 is a view similar to FIG. 2, but of a double side coated anode.

Referring now to FIGS. 2 and 3 a composite anode 25 is illustrated of well known type and can be as described in our prior patent application Ser. No. 302,622, filed Jan. 27, 1989, now U.S. Pat. No. 4,960,655.

The anode 25 includes a base layer 27 of carbon or graphite which can be in flat, or fabric form of fibre or powder to which a layer 26 of lithium has been applied by well known means. The layer 27 has a layer 15 of plastic film thereon on surface 28 of the anode or also on surface 29, applied thereto which provides the desired protection and insulating characteristics desired.

While the film 15 is illustrated of plastic composition a metal foil or plastic coated metal foil (not shown) of material compatible with the battery components can be substituted for the plastic film 15.

It will thus be seen that structure has been provided with which the objects of the invention are achieved.

We claim:

1. In an alkaline metal or alkaline earth metal battery which has an anode at least a portion of which is of alkaline metal or alkaline earth metal with at least one exposed surface not in contact with battery material the improvement for protection which compromises a layer of compatible protective material adjacent to and overlying said exposed surface of said anode, and a coating of compatible adhesive on said layer of material and in adherent contact with said exposed surface of said anode.

2. Protection of anodes as defined in claim 1 in which said anode is a layer of alkaline or alkaline earth metal in foil form.

3. Protection of anodes as defined in claim 1 in which said anode includes a layer of carbon or graphite and a layer of alkaline or alkaline earth metal.

4. Protection of anodes as defined in claim 1 in which said coating is an epoxide based composition.

5. Protection of anodes as defined in claim 1 in which said coating is an acrylic based composition.

6. Protection of anodes as defined in claim 1 in which said coating is a rubber based composition.

7. Protection of anodes as defined in claim 1 in which said adhesive coating is anhydrous.

8. Protection of anodes as defined in claim 1 in which said layer of material is a plastic film.

9. Protection of anodes as defined in claim 1 in which said layer of material is of metal foil.

10. Protection of anodes as defined in claim 1 in which said anode is of lithium metal.

11. Protection of anodes as defined in claim 1 in which said anode includes a layer of metal substrate.

12. Protection of anodes as defined in claim 8 in which said plastic is anhydrous.

13. Protection of anodes as defined in claim 9 in which said metal foil is coated with plastic.

14. Protection of anodes as defined in claim 13 in which said plastic is anhydrous.

* * * * *